(12) United States Patent
Andrews et al.

(10) Patent No.: US 11,216,293 B2
(45) Date of Patent: Jan. 4, 2022

(54) COMMAND LINE INTERFACE

(71) Applicant: Allied Telesis Holdings Kabushiki Kaisha, Tokyo (JP)

(72) Inventors: Keith Michael Andrews, San Jose, CA (US); Philip Yim, Petaluma, CA (US)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 936 days.

(21) Appl. No.: 13/937,665

(22) Filed: Jul. 9, 2013

(65) Prior Publication Data
US 2015/0019199 A1    Jan. 15, 2015

(51) Int. Cl.
*G06F 9/455* (2018.01)

(52) U.S. Cl.
CPC .............................. *G06F 9/45508* (2013.01)

(58) Field of Classification Search
None
See application file for complete search history.

(56) References Cited

U.S. PATENT DOCUMENTS

| | | | | |
|---|---|---|---|---|
| 5,390,314 | A * | 2/1995 | Swanson | G06F 9/45512 717/138 |
| 5,604,896 | A * | 2/1997 | Duxbury et al. | 703/26 |
| 5,892,950 | A * | 4/1999 | Rigori | G06F 9/45508 341/60 |
| 6,389,464 | B1 * | 5/2002 | Krishnamurthy | H04L 41/0213 709/220 |
| 6,405,365 | B1 * | 6/2002 | Lee | 717/106 |
| 6,681,243 | B1 * | 1/2004 | Putzolu et al. | 709/202 |
| 6,892,233 | B1 * | 5/2005 | Christian | H04L 41/0813 709/221 |
| 7,039,724 | B1 * | 5/2006 | Lavian | H04L 41/0213 707/999.001 |
| 7,092,940 | B1 * | 8/2006 | Ethen et al. | |
| 7,240,364 | B1 * | 7/2007 | Branscomb | H04L 29/12113 726/5 |
| 7,620,848 | B1 * | 11/2009 | Tanner | G06F 11/0709 709/224 |
| 8,266,329 | B2 * | 9/2012 | Taha et al. | 710/5 |
| 8,478,580 | B1 * | 7/2013 | Bishara et al. | 704/2 |
| 8,954,998 | B1 * | 2/2015 | Clemm et al. | 719/328 |
| 9,049,044 | B1 * | 6/2015 | Marshall et al. | |

(Continued)

OTHER PUBLICATIONS

Wikipedia Contributors, "Communications protocol," Wikipedia, The Free Encyclopedia, https://en.wikipedia.org/w/index.php?title=Communications_protocol&oldid=562448660 (as archived Jul. 1, 2013, accessed Feb. 17, 2017), 18 pages.*

(Continued)

*Primary Examiner* — Omar F Fernandez Rivas
*Assistant Examiner* — Robert S Brock
(74) *Attorney, Agent, or Firm* — Concept IP LLP; Michael Zarrabian

(57) ABSTRACT

Systems, apparatus and methods described herein are configured to receive a user command line instruction, of a first type, for transmission to a device and convert the user command line instruction to a device specific command line instruction. In some embodiments, the systems, apparatus and methods described herein are further configured to transmit the device specific command line instruction to the device, and convert a device specific response received from the device to a response of the first type.

16 Claims, 10 Drawing Sheets

(56) References Cited

U.S. PATENT DOCUMENTS

| | | | |
|---|---|---|---|
| 2002/0059425 A1* | 5/2002 | Belfiore et al. | 709/226 |
| 2003/0048287 A1* | 3/2003 | Little et al. | 345/705 |
| 2003/0056193 A1* | 3/2003 | Perycz et al. | 717/107 |
| 2003/0115305 A1* | 6/2003 | Murray | H04L 41/022 709/222 |
| 2003/0126195 A1* | 7/2003 | Reynolds | G06F 11/2023 709/203 |
| 2003/0135508 A1* | 7/2003 | Chorafakis | G06F 8/51 |
| 2003/0204612 A1* | 10/2003 | Warren | 709/230 |
| 2004/0117452 A1* | 6/2004 | Lee et al. | 709/208 |
| 2004/0117613 A1* | 6/2004 | Edmondson | H04L 47/10 713/150 |
| 2004/0153449 A1* | 8/2004 | Bettendorf | H04L 41/0226 |
| 2004/0158621 A1* | 8/2004 | Reyna | G06F 8/30 709/220 |
| 2004/0181541 A1* | 9/2004 | Groenendaal et al. | 707/100 |
| 2005/0129035 A1* | 6/2005 | Saito | 370/401 |
| 2006/0031447 A1* | 2/2006 | Holt | H04L 41/00 709/223 |
| 2006/0036723 A1* | 2/2006 | Yip et al. | 709/223 |
| 2006/0085532 A1* | 4/2006 | Chu et al. | 709/223 |
| 2006/0101375 A1* | 5/2006 | Loughlin et al. | 717/104 |
| 2006/0190579 A1* | 8/2006 | Rachniowski | G06F 9/45512 709/223 |
| 2006/0235968 A1* | 10/2006 | Murray et al. | 709/224 |
| 2007/0130192 A1* | 6/2007 | Bolder | H04L 41/0806 |
| 2007/0206630 A1* | 9/2007 | Bird | H04L 41/24 370/465 |
| 2007/0217425 A1* | 9/2007 | Claise | H04L 41/0213 370/392 |
| 2007/0288467 A1* | 12/2007 | Strassner et al. | 707/10 |
| 2008/0126520 A1* | 5/2008 | Werber et al. | 709/221 |
| 2008/0155424 A1* | 6/2008 | Moran et al. | 715/736 |
| 2008/0222603 A1* | 9/2008 | Shaw et al. | 717/120 |
| 2009/0006590 A1* | 1/2009 | Shamilian et al. | 709/223 |
| 2009/0158153 A1* | 6/2009 | Courteaux | 715/708 |
| 2009/0228821 A1* | 9/2009 | Tapper | G06F 9/45512 715/771 |
| 2010/0241727 A1* | 9/2010 | Bourakov | G06F 9/45512 709/217 |
| 2011/0004914 A1* | 1/2011 | Ennis, Jr. | H04L 41/0853 726/1 |
| 2012/0150939 A1* | 6/2012 | Zaifman et al. | 709/203 |
| 2012/0303758 A1* | 11/2012 | Anbarasan et al. | 709/218 |
| 2013/0132461 A1* | 5/2013 | Patel | 709/202 |
| 2014/0032449 A1* | 1/2014 | Kacin | H04L 41/0883 706/12 |

OTHER PUBLICATIONS

Deca, Rudy. "Meta-cli configuration model for network device management." PhD diss., Concordia University, 2003. 138 pages (Year: 2003).*

Enck, et al. "Configuration management at massive scale: system design and experience." IEEE Journal on Selected Areas in Communications 27, No. 3 (2009): 323-335 (Year: 2009).*

* cited by examiner

COMMAND LINE INTERFACE

BACKGROUND

In general, a command line interface (CLI) is utilized to manage devices in a network. Each device may be managed and configured by utilizing a device specific CLI. The device specific CLI may or may not be proprietary. In other words, if a network includes five different devices, then five different CLIs are utilized to manage and configure each device in the network. As such, the onus is on a user (e.g., network administrator) to remember the syntax and semantics for each specific CLI command for each CLI utilized by each device, which is cumbersome, inefficient, and time consuming. Further, in some situations, the user may inadvertently utilize the wrong CLI commands with the wrong device, resulting in delays and inefficiencies in resolving issues and managing devices in the network.

SUMMARY

Accordingly, a need has arisen for a CLI that may be utilized to manage disparate devices. Further, there is a need for a CLI to utilize a single command line instruction type to manage different devices in a network, irrespective of the device specific command line instructions utilized by the device.

The methods, systems, and apparatus disclosed herein provide a CLI to manage disparate devices of a network. In some embodiments, the CLI may be an interface that allows a user to input command line instructions that may be used to manage different devices in a network, regardless of the device specific command line instructions utilized by each of the devices. In some embodiments as disclosed herein, the command line instructions may be device type agnostic command line instructions. In some embodiments, the command line instructions disclosed herein may be a specific type of command line instructions that may, nevertheless be used to manage different devices in a network (e.g., manage devices that utilize the specific type of command line instructions and devices that do not utilize the specific type of command line instructions).

In some embodiments disclosed herein, the CLI may be utilized to emulate a terminal session. Once an emulated terminal session has been established, the CLI may be utilized to receive command line instructions, e.g., device type agnostic command line instructions, to configure, manage and provision devices in a network. Further, the embodiments disclosed herein may convert and customize the received command line instructions, e.g., device type agnostic command line instructions, into device customized instructions that are subsequently transmitted to a device in a network in some embodiments. In some embodiments disclosed herein, device specific responses received from devices may be converted into responses of command line instruction type utilized by a CLI to emulate a terminal session.

In some embodiments, a method may comprise of receiving a user command line instruction, of a first type, for transmission to a device, and converting the user command line instruction to a device specific command line instruction. In some embodiments, the method may further comprise of transmitting the device specific command line instruction to the device, and converting a device specific response received from the device to a response of the first type.

In some embodiments, the first type of the user command line instruction may be device type agnostic. In some embodiments, the first type of the user command line instruction may be user selectable.

In some embodiments, the method may further comprise of querying the device to receive device attributes. In some embodiments, converting the user command line instruction into the device specific command line instruction may be based on the received device attributes. In some embodiments, the device attributes are based on object identifiers associated with the device.

In some embodiments, the user command line instruction may be operable to configure the device. In some embodiments, the transmission of device specific command line instruction and receipt of the response associated therewith may utilize a command line instruction of a second type. In some embodiments, the transmission of the device specific command line instruction and receipt of a response associated therewith may utilize simple network management protocol (SNMP). In some embodiments, the transmission of the device specific command line instruction and receipt of a response associated therewith may utilize Extensible Markup Language (XML).

In some embodiments, an apparatus may comprise a memory and a processor. In some embodiments, the processor may be configured to receive a command line instruction, of a first type, for configuring a first device and a second device and convert the user command line instruction to a device management instruction. In some embodiments, the processor may be further configured to customize the device management instruction based on attributes associated with the first device to generate a first device customized instruction, and customize the device management instruction based on the attributes associated with the second device to generate a second device customized instruction. In some embodiments, the processor may be further configured to transmit the first device customized instruction to the first device and the second device customized instruction to the second device.

In some embodiments, the processor may be further configured to determine the first device attributes, and determine the second device attributes. In some embodiments, the processor may be further configured to convert a device specific response received from the first device to a first response of the first type, and convert a device specific response received from the second device to a second response of the first type.

In some embodiments, the transmission of first device customized instruction and the second device customized instruction may utilize simple network management protocol (SNMP). In some embodiments, the first device may be of a second type, and the second device may be of a third type.

In some embodiments, a non-transitory computer-readable storage medium having stored thereon, computer executable instructions that, if executed by a first device, may causes the first device to perform a method comprising receiving a command line instruction, of a first type, for configuring a first device and a second device and converting the user command line instruction to a device management instruction. The method may further comprise customizing the device management instruction based on attributes associated with the first device to generate a first device customized instruction, and customizing the device management instruction based on the attributes associated with the second device to generate a second device customized instruction. In some embodiments, the method may further comprise transmitting the first device customized instruction to the first device and the second device customized instruction to the second device.

In some embodiments, the method may further comprise converting a device specific response received from the first device to a first response of a second type, and converting a device specific response received from the second device to a second response of the second type.

These and various other features and advantages will be apparent from a reading of the following detailed description.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Figure 1:
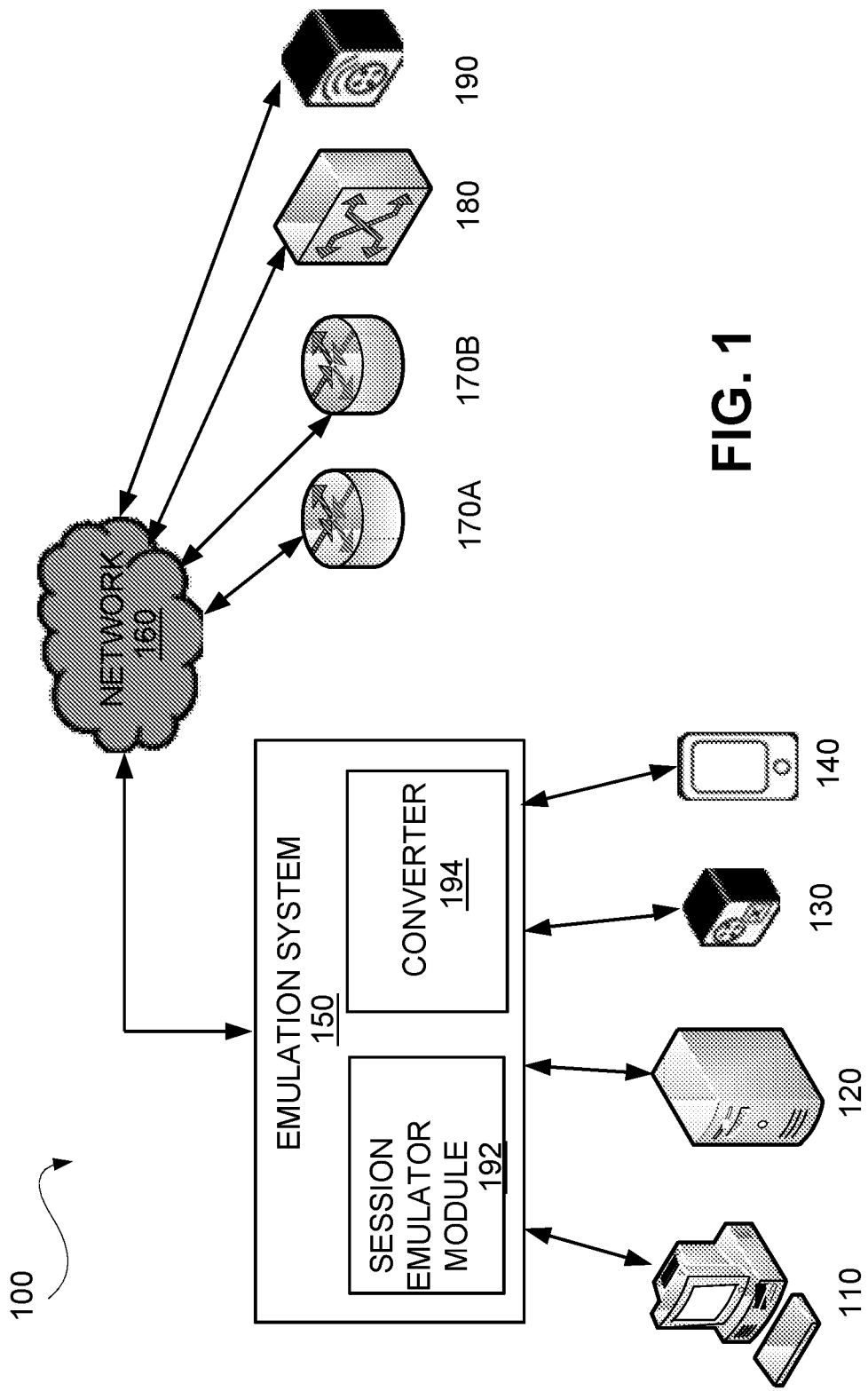
FIG. 1 shows a system utilizing a command line interface (CLI) to manage devices in a network in accordance with one embodiment.

Reference will now be made in detail to various embodiments in accordance with the claimed invention, examples of which are illustrated in the accompanying drawings. While the claimed invention will be described in conjunction with various embodiments, it will be understood that these various embodiments are not intended to limit the scope of the embodiments. On the contrary, the claimed invention is intended to cover alternatives, modifications, and equivalents, which may be included within the scope of the appended Claims. Furthermore, in the following detailed description of various embodiments, numerous specific details are set forth in order to provide a thorough understanding of the claimed invention. However, it will be evident to one of ordinary skill in the art that the claimed invention may be practiced without these specific details. In other instances, well known methods, procedures, components, and circuits have not been described in detail as not to unnecessarily obscure aspects of the claimed invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "converting," "transmitting," "storing," "determining," "sending," "querying," "providing," "accessing," "associating," "configuring," "initiating," "customizing", "mapping" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

A need has arisen for a CLI that uses a single command line instruction type (e.g., user selectable device specific CLI commands, device agnostic CLI commands, and device specific CLI commands, etc.) to manage devices in a network regardless of their type. In other words, there is a need to utilize a command line instruction that may utilize the same syntax and semantics with different device types, irrespective of the device specific command line instruction utilized by each device.

In some embodiments, a CLI disclosed herein may be configured to receive command line instructions of a type that may be used to configure and manage devices of different types, regardless of the type of command line instructions utilized by the devices. In some embodiments, the CLI disclosed herein may be utilized to emulate a terminal session. The CLI disclosed herein may emulate a terminal session by giving the appearance of a direct connection-based terminal session between a user device and a managed device, such that it appears that a user command line instruction inputted into the CLI is directly transmitted to the managed device for execution. The embodiments disclosed herein, convert the command line instructions into device customized instructions before transmission to the managed device.

Because the user input command lines instructions are not directly transmitted to a managed device, the embodiments disclosed herein allows a user to use device type agnostic command line instructions or user preferred command line instructions to manage disparate devices, regardless of their type or their device specific command line instructions. Accordingly, embodiments described herein eliminate the need to remember every CLI instruction specific to each device type by facilitating one set of command line instructions to manage disparate devices within the network. Moreover, embodiments described herein enable a user to select CLI instructions of a type familiar to the user to manage devices that use different CLI instructions.

Further, methods and apparatus described herein may be configured to receive and convert a device specific response into a response formatted in accordance with a command line instruction type utilized by the CLI to establish an emulated terminal session. In this way, a user may view responses and information about different device types in a uniform and consistent format, irrespective of the device specific response formats utilized by each device in the network.

Referring now to FIG. 1, a system utilizing a CLI to manage devices in a network is shown in accordance with one embodiment. In some embodiments, system 100 includes, but not limited to, a computing device 110, a server 120, a switch router 130, a portable mobile device 140 (e.g., mobile device, tablet, laptop, smartphone), an emulation system 150, a network 160, routers 170A-170B, a switch 180 and a wireless router 190. It is noted that computing device 110, server 120, switch router 130 and portable mobile device 140 are collectively referred to as "user devices" throughout the specification. It is further noted that routers 170A-170B, switch 180 and wireless router 190 may be collectively referred as "managed devices" throughout the specification.

In some embodiments, one or more user devices (e.g., computing device 110, server 120, switch 130 and/or portable mobile device 140) may transmit command line instructions to the emulation system 150 to manage one or more managed devices (e.g., routers 170A-170B, switch 180 and wireless router 190) via network 160. In some embodiments, the emulation system 150 converts the received command line instructions into device customized instructions utilized by each managed device.

Further, the emulation system 150 may receive device specific responses from one or more of the managed devices, and convert the device specific responses into a response in accordance with the syntax and semantics of a command line instruction type utilized by the CLI. The converted response may be further displayed on a display of one or more user devices (e.g., computing device 110, server 120, switch/router 130, portable mobile device 140).

Before proceeding to further describe the various components of system 100, it is appreciated that devices 110, 120, 130, 140, 170A-170B, 180 and 190 are exemplary and are not intended to limit the scope of the embodiments. For example, the system 100 may include other devices, such as workstations, modems, printers, bridges, hubs, voice over internet protocol (IP) telephones, IP video cameras, computer hosts and other devices to name a few. Further, it may be appreciated that network 160 may a telecommunications network that allows the devices and components of system 100 to exchange data. For instance, network 160 may be wireless network, a local area network (LAN), a personal area network (PAN), a wide area network (WAN), or any other network that allows user devices 110, 120, 130, 140, emulation system 150 and managed devices 170A-170B, 180 and 190 to exchange data.

Referring now to user devices (e.g., devices 110, 120, 130 and 140) of FIG. 1, the user devices may be utilized to establish an emulated terminal session with one or more of the managed devices (e.g., routers 170A-170B, switch 180, and wireless router 190) using a CLI described herein. For example, a request to establish an emulated terminal session may be made by initiating a command line shell program (e.g., UNIX shell, MS-DOS shell), and entering a keyword or an IP address of a managed device (e.g., devices 170A, 170B, 180 and/or 190).

Figure 7:
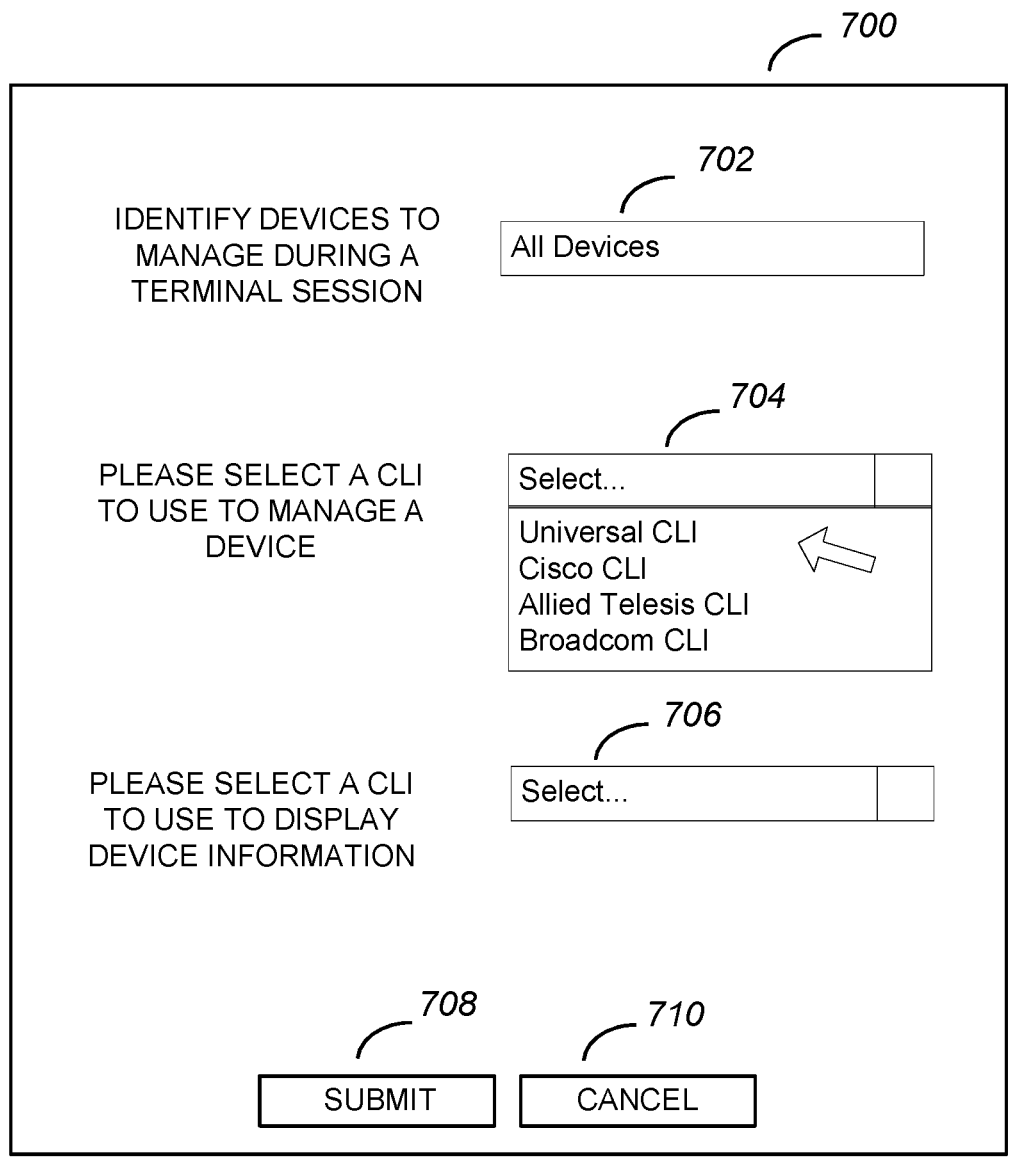
FIG. 7 shows an exemplary graphical user interface (GUI) that may be used to initiate an emulated session with a managed device in a network according to one embodiment.

In some examples, a request to establish an emulated session with a remote device may be initiated via a graphical user interface (GUI). The user may enter text, make a selection among the managed devices, and press a button or some combination thereof to initiate an emulated terminal session with the selected managed device. FIG. 7 provides an illustrative GUI that may be used to initiate an emulated terminal session. GUI 700 includes graphical components, such as textbox 702, dropdown menus 704 and 706, and buttons 708 and 710 to select a managed device for an emulated terminal session. It is appreciated that the dropdown menus, textbox, and buttons illustrated are exemplary and not intended to limit the scope of embodiments. For example, other graphical components, such as checkboxes, radio buttons may be used instead. Furthermore, instead of a specific GUI element shown a different GUI element may be used, e.g., a dropdown menu may be used instead of textbox 702.

In FIG. 7, the user identified "All Devices" in textbox 702 that the user would like to manage via an emulated terminal session. In other instances, the user may select a specific device or a couple of devices to manage during an emulated terminal session. Further, the user may use dropdown menus 704 and 706 to select types of command line instructions to utilize to manage devices in a network and to use to format responses received from the managed devices. It is appreciated that the same or different types of command line instructions may be selected to format commands transmitted to devices and responses received from devices. In this way, GUI 700 provides a user with the flexibility to manage devices and view information about devices in a command line instruction type that a user desires to use, irrespective of the device specific command line instructions utilized by each device in the network. Accordingly, a user may select command line instructions of a type familiar to the user to manage devices that use different command line instructions.

Once the user selects submit button 708, a request to initiate an emulated session may be sent to an emulation system similar to emulation system 150 of FIG. 1. Alternatively, the user may select the cancel button 710 to cancel initiation of an emulated terminal session.

Returning back to FIG. 1, the request to initiate an emulated terminal session may be received by emulation system 150 in some embodiments. In some embodiments, the emulation system 150 may be configured to receive command line instructions and responses from devices 110, 120, 130, 170A, 170B, 180 and 190 via a CLI. As described herein, the command line instructions may be of a type that may be used to manage and configure different devices of network 160, regardless of the device specific command line instructions utilized by the device. The command line instruction as used herein includes device type agnostic command line instructions, user selected command line instructions, and/or device specific command line instruction to manage different devices independent of the device type and the specific type of command line instructions utilized by the device.

In some embodiments, the emulation system 150 may include a session emulator module 192 and a converter 194. Accordingly, an emulated terminal session may be initiated with a managed device (e.g., devices 170A, 170B, 180, and/or 190), and the command line instructions (e.g., user selectable device specific CLI commands, device agnostic CLI commands, a device specific CLI commands, etc.) may be converted into device customized instructions. It is appreciated that device customized instructions may be device management instructions that are device type agnostic, but customized based on device attributes. For example, device management instructions may include SNMP, XML, etc. As such, the received command line instructions may be converted into device management instructions and customized based on each device attributes (e.g., based on object identifiers (OIDs)).

Furthermore, device specific responses may be converted into responses formatted in a command line instruction type utilized by the CLI to emulate a terminal session. In some embodiments, device specific responses may be converted into responses of user selected command line instruction type and/or a device specific command line instruction type. In this way, a user may view responses and information about different device types in a format familiar to the user even if the devices format responses according to a different command line instruction type.

As noted above, the emulation system 150 includes a session emulator module 192. In some embodiments, the session emulator module 192 creates a terminal session that emulates a login and connection-based session, enabling a user to manage a remote device using a CLI described herein, rather than establishing a terminal session by utilizing a device specific CLI. In some embodiments, the emulation of a terminal session is achieved by requesting user credentials and generating a prompt in a similar manner that a device specific CLI establishes a terminal session. As such, to a user it appears that an active communication link has been established between a user device and a managed device. However, the session emulator 192 creates an interface to receive command line instructions (e.g., user selectable device specific CLI commands, device agnostic CLI commands, a device specific CLI commands, etc.) that is processed by the emulation system 150 instead of by the managed device.

In some embodiments, the session emulator module 192 may be configured to receive one or more requests from one or more user devices (e.g., devices 110, 120, 130 and/or 140) to initiate an emulated session with one or more of the managed devices (e.g., devices 170A, 170B, 180, 190) in the network 160. For instance, the session emulator module 192 may receive one or more keywords, such as "initiate universal command line interface," or an IP address of a managed device, such as "UCC 10.4.16.189," or receive an instruction from the GUI as described in FIG. 7, etc.

In response to receiving a request to initiate an emulated session, the session emulator module 192 may verify whether the requested device to be managed is present in the network 160. In some embodiments, the session emulator module 192 may transmit an Internet Control Message Protocol (ICMP) request to the requested device, such as router 170A, to determine whether router 170A is active and enabled in the network 160. The session emulator module 192 may verify the presence of a device in the network based on whether the device is Simple Network Management Protocol (SNMP) enabled in some embodiments. For example, the session emulator module 192 may execute a port scan to determine whether the device includes an SNMP agent. In some embodiments, the session emulator module 192 may execute a discovery mechanism to determine whether a device is present in the network 160. For example, the session emulator module 192 may poll for a specific managed device in the network 160.

In response to determining that the managed device is present in the network 160, the session emulator module 192 may transmit a request to a user device (e.g., device 110, 120, 130, and/or 140) requesting for user credentials. For example, a user of a device may be prompted for his username and password. Upon receiving the user credentials, the session emulator module 192 may use the user credentials to authenticate the user.

In some embodiments, the session emulator module 192 may authenticate the user credentials by providing the user credentials as an authentication string in a query to a managed device. For example, the session emulator module 192 may query a managed device for device attributes, such as a model number, make of the device, vendor information that manufactured the device, hardware information (e.g., memory size), operating system information, the device specific CLI, and other device attributes. In this example, the query for device attributes to the managed device includes an authentication string (e.g., user credentials), which is used by the managed device to authenticate the user prior to providing a response to the query. Here, if the user is authenticated by the managed device, then the result of the query may include device attribute information (e.g., a value associated with an OID of a device attribute of interest). However, if the user is not authenticated, then the result of the query may be an error message, such as "Invalid Login/Password" and/or "Access Denied," and an emulated session to the device may not be initiated.

In some instances, the session emulator module 192 may authenticate user credentials by querying a database. In some embodiments, the user credentials are authenticated to determine whether the user is authorized access to certain devices in network 160. Moreover, the type of access may be determined, e.g., read access, write access, configure access, etc. It is appreciated that in an alternative embodiment, a managed device may transmit user credentials to the session emulator module 192 to determine the access type of a user based on the received information from the user and the managed device.

In some embodiments, once the user credentials are authenticated, the session emulator module 192 may initiate an emulated terminal session with the managed device by transmitting a prompt for display on a user device (e.g., devices 110, 120, 130, and/or 140). For example, the prompt may be some alphanumeric prompt, such as ">>>", "UCC," to indicate that an emulated session has been established, enabling a user to enter and transmit command line instructions to manage and configure one or more managed devices (e.g., devices 110, 120, 130, 140) via network 160.

According to one embodiment, the converter 194 may be configured to receive command line instructions, e.g., device agnostic command line instructions, device specific command line instructions, etc. The converter 194 may convert the received command line instructions into a device management instructions. The device management instructions may be instructions that are device type agnostic, e.g., SNMP, XML, etc. However, the device management instructions are customized based on device specific attributes associated with each device. The customized device management instructions may be transmitted to a device to be managed. As such, each device regardless of its type may be managed using the same command line instruction. For instance, if an emulated session is established between computer 110 and SNMP enabled router 170A and the switch 180, the converter 194 may receive one CLI instruction from device 110. The received CLI instruction may be converted into the device management instructions, e.g., SNMP instructions such as GetRequest, SetRequest, GetNextRequest, etc. The device management instruction may then be customized based on device attributes. For example, the device management instruction may be customized based on device attributes of the router 170A to generate a first customized management instruction and it may also be customized based on device attributes of the switch 180 to generate a second customized management instruction. The converter 194 transmits the first and the second customized management instructions to the router 170A and the switch 180, respectively.

Further, the converter 194 may receive device specific responses from the device to be managed. The converter 194 may be configured to convert the device specific responses to responses formatted in accordance with the syntax and semantics of a command line instructions utilized by a CLI to emulate a terminal session in some embodiments. In some embodiments, converter 194 may be configured to device specific responses into response of a user selected type, as described with respect to FIG. 7. For example, converter 194 may receive SNMP responses from router 170A and switch 180, and convert the SNMP responses into responses that are formatted according to the syntax and semantics of a device agnostic CLI command line instruction type.

It is appreciated that the discussion of converting the received command line instructions into SNMP instructions that are subsequently customized based on device attributes are exemplary and is not intended to limit the scope of the embodiments. Furthermore, it is appreciated that the discussion of converting device specific responses into device agnostic CLI command line instruction type responses are exemplary and is not intended to limit the scope of the embodiments. For example, in some embodiments, the received command line instruction may be converted into Extensible Markup Language (XML) or a device specific CLI instruction, and XML responses and/or device specific CLI responses may be converted into device type agnostic command line responses. In some embodiments, the converter 194 may convert device specific CLI command line instructions into SNMP, XML, and/or other device specific CLI command line instructions. Further, in this embodiment, the converter 194 may be configured to convert SNMP, XML and device specific CLI command line responses into other device specific CLI command line responses.

Figure 3:
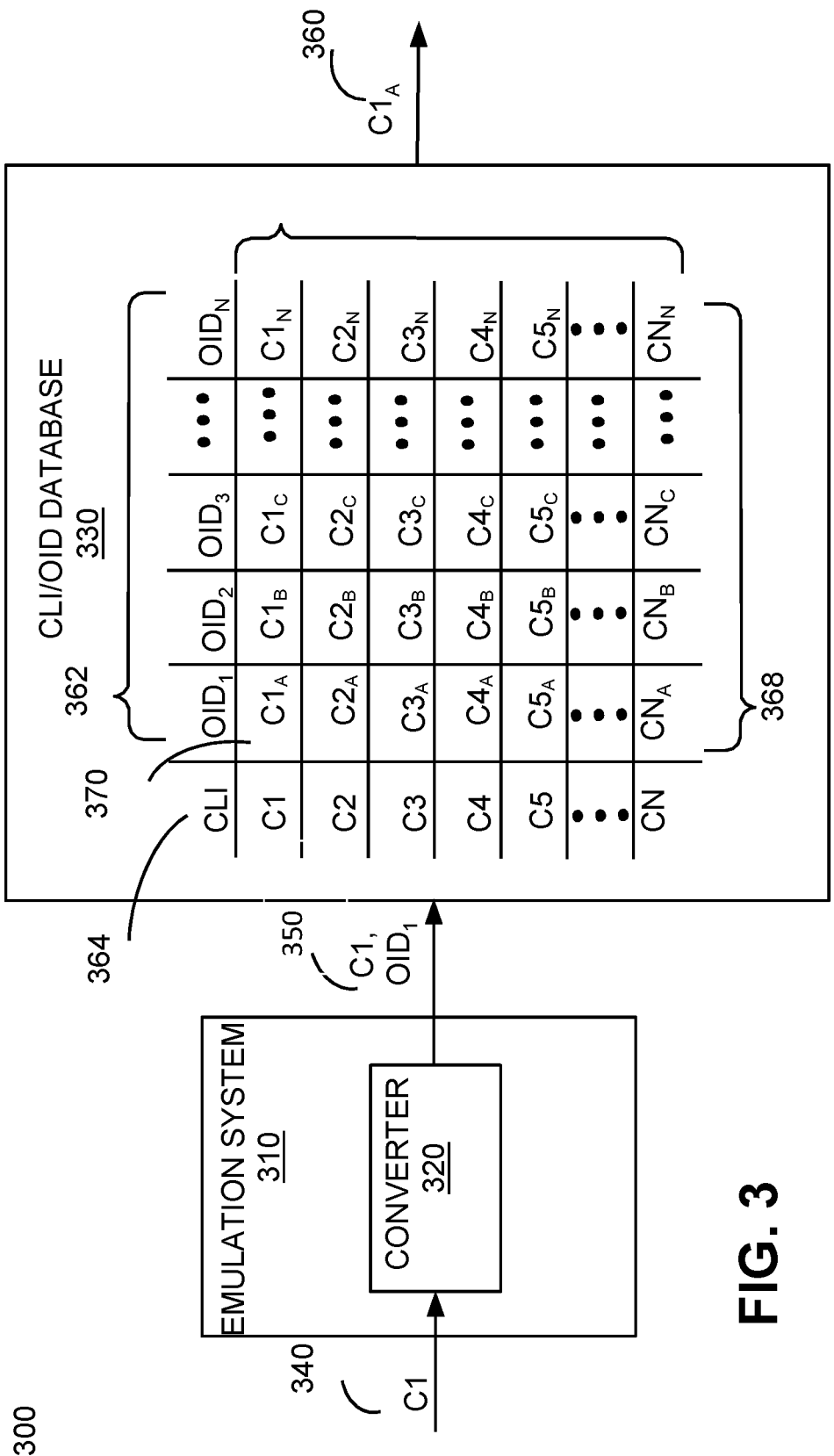
FIG. 3 shows a system that converts a device agnostic command into a device customized command in accordance with one embodiment.

In some embodiments, the converter 194 may convert command line instructions into device specific instructions by querying a database that associates command line instructions and attributes of a managed device into device specific instructions, as described in greater detail in FIG. 3. The device specific instructions based on querying the database may be transmitted to the managed device. In some embodiments, the converter 194 may convert a command line instruction by querying a text file that includes a list of command line instructions and its corresponding device specific instructions. The device specific instructions based on querying the text file query may be transmitted to the managed device.

Further, it may be appreciated that because network 160 includes different and disparate managed devices, each of these devices may support the configuration of some managed attributes, while configuration of other attributes may not be supported. These differences are largely due in part to differences in device attributes of each device, such as model number, make of the device, vendor information, hardware information, device capability, operating system information, device specific CLI as described herein. For example, SNMP enabled router 170A may be a router manufactured by vendor A and SNMP enabled wireless router 190 may be manufactured by vendor B. Because switch 170A and wireless adapter 190 are manufactured by different vendors, each vendor may have defined different Management Information Bases MIBs) to describe attributes of the managed device using different OIDs to identify the attributes that can be read or set using SNMP. In this example, OID 124 (not shown) may be set and read on router 170A, while OID 124 may not be supported by wireless router 190, and thus, may not be set and read. It is appreciated that the differences may not necessarily be based on manufacturing by different vendors. For example, a same router manufactured by the same vendor at different periods may utilize different CLIs because they are different models and generations and they have different capabilities.

As such, in some embodiments, prior to converting a command line instruction into a device customized instruction, the converter 194 may determine whether the attribute to be configured is available and supported by a managed device (e.g., devices 170A, 170B, 180 and/or 190). In some embodiments, the converter 194 may determine which attributes are available for configuration on a managed device by querying the managed device or by querying a database. For example, the converter 194 may query an SNMP enabled switch 180 for an OID that identifies an attribute of interest. In this example, it is determined that the OID is supported by switch 180 if the query returns a value associated with the OID. However, if an error message is received, then it is determined that the OID is not supported by switch 180.

In some embodiments, the converter 194 may transmit device customized instructions along with user credentials to the device to be managed in order to determine whether a user has privilege to configure and manage certain attributes of the managed device. For example, the convertor 194 may transmit a request to the wireless router 190 in order to get an OID that identifies an attribute of interest of the wireless router 190. Along with the request, the converter 194 may send a username and password received from the user to the wireless router 190. In this example, if a value associated with the OID is returned, then it is determined that the user has privilege to configure and manage the specific attribute of the device. However, it is determined that the user does not have privilege to manage and configure the attribute of interest if an error message is received. As such, different user may be provided different privileges, e.g., read, write, configure, etc., access to each device.

Figure 2:
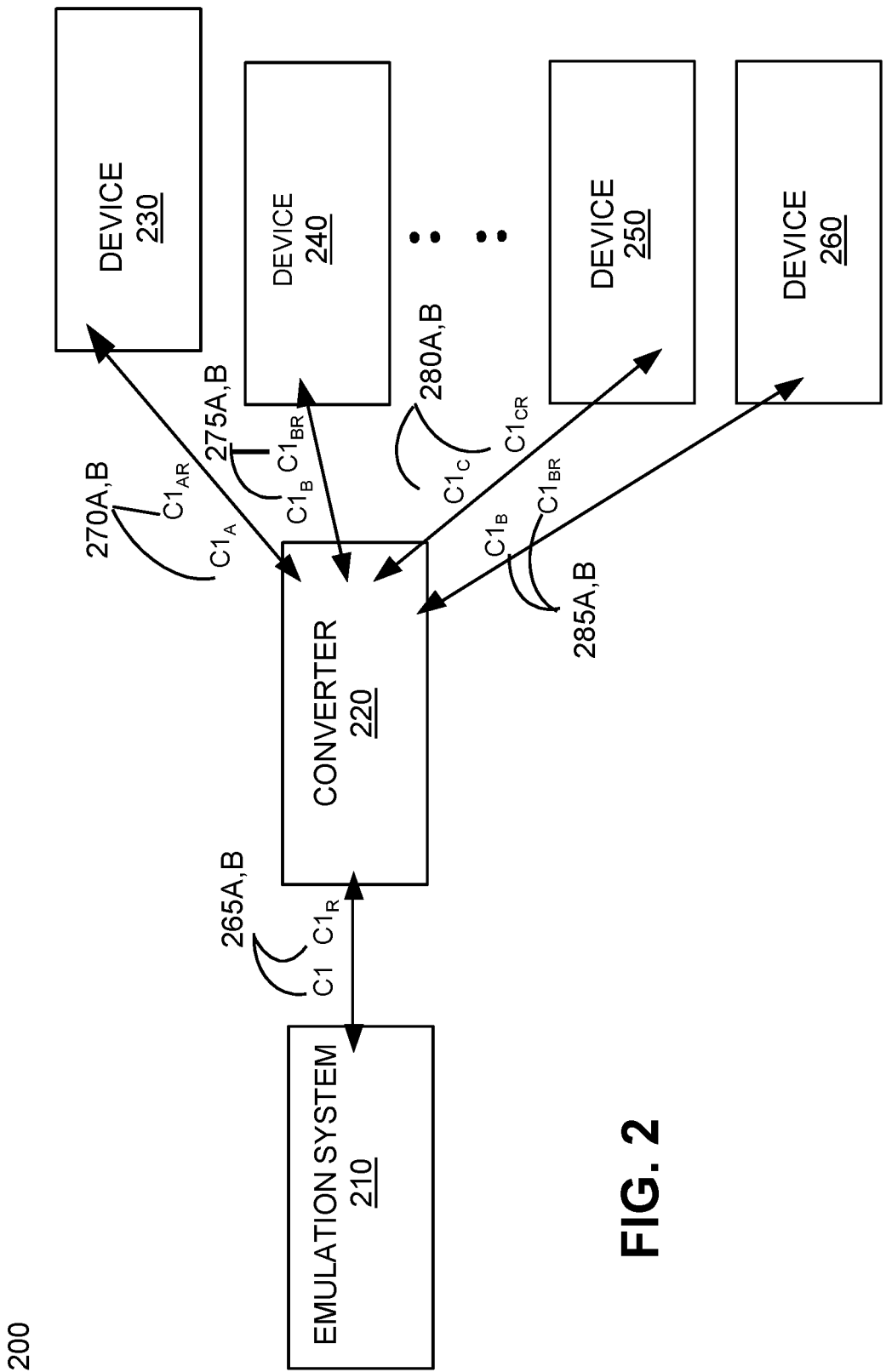
FIG. 2 shows a system that converts command line instructions to device customized instructions, and converts device specific responses into responses formatted in accordance with a command line instruction type utilized by a CLI in accordance with one embodiment.

Referring now to FIG. 2, a system that converts command line instructions to device customized instructions, and converts device specific responses into responses formatted in accordance with a command line instruction type utilized by a CLI is shown in accordance with one embodiment. In some embodiments, system 200 includes an emulation system 210, a converter 220, and devices 230-260.

In some embodiments, emulation system 210 may be configured in a substantially similar manner as emulation system 150, except that the converter 220 is separate from the emulation system 150. In some embodiments, converter 220 may be configured in a substantially similar manner as converter 194 of FIG. 1. For instance, after emulation system 210 initiates an emulated terminal session with devices 230-260, the converter 220 may receive a command C1 265A of a first type from emulation system 210. In some embodiments, a command of a first type may be a command that utilize the syntax and semantics of a device type agnostic command line instructions type. In some embodiments, a command of a first type may be a command that is formatted in accordance with a device specific CLI instruction type. In other embodiments, a command of a first type may be a command that is formatted in accordance with a device specific attributes.

In response to receiving command C1 265A, the converter 220 converts command C1 265A to device customized instructions for each device 230-260. For example, for device 230 command C1 265 may be converted into an XML command $C1_A$ 270A that is customized based on attributes, e.g., OIDs, of device 230. In contrast, device 240 and 260 may be SNMP enabled devices. As such, command C1 265A may be converted into SNMP commands $C1_B$ 275A and $C1_B$ 285A that are customized based on attributes, e.g., OIDs, of device 240 and 250 that happen to be of the same type. Further, for device 250, the converter 220 may convert command C1 265A into a proprietary CLI command $C1_C$ 280A that is customized based on device 250 attributes, e.g., OIDs. As the example illustrates, converter 220 described herein may be configured to convert a single command line instruction into multiple different customized instructions based on device attributes. In this way, a user may use a single command line instruction to configure and manage different devices with different attributes and perhaps with different types and capabilities.

In some embodiments, converter 220 may be configured to convert one or more different device specific responses into a response formatted in accordance with a format of a command line instructions utilized by the CLI to emulate a terminal session or in accordance with a user selected response format, as described with respect to FIG. 7. In FIG. 2, a command line instruction of a first type may be utilized. As such, converter 220 may convert device specific responses into response formatted in accordance with the first type. For example, converter 220 may receive an XML response $C1_{AR}$ 270B, SNMP responses $C1_{BR}$ 275B and 285B, and a device specific CLI response $C1_{CR}$ 280B, and convert them into a response $C1_R$ 265B formatted in accordance to the syntax and semantics utilized by the command line instructions of the first type.

Referring now to FIG. 3, a system that converts a device agnostic command into a device customized command is shown in accordance with one embodiment. In some embodiments, system 300 includes an emulation system 310 and a CLI/OID database table 330.

In some embodiments, emulation system 310 may be configured in a substantial similar manner as emulation systems 150 and 210 of FIGS. 1 and 2, respectively. In some embodiments, the emulation system 310 may include a converter 320. Converter 320 may be configured in a substantially similar manner as converters 194 and 220 of FIGS. 1 and 2, respectively, in some embodiments.

In some embodiments, converter 320 may receive a device agnostic command C1 340. The converter 320 may also receive an OID of the device to be managed and configured, e.g., $OID_1$, in the managed device. In FIG. 3, after receiving command C1 340, the converter 320 may determine device attributes, such as vendor information, model number, and other attributes about of the managed device. For instance, this may be determined by querying the managed device for OIDs that identify the device attributes. In some instances, the converter 320 may access the device attribute from a memory (not shown) of emulation system 310 or by accessing a database storing device attributes associated with devices within the network.

Based on the device attributes, the converter 320 may convert C1 340, the device agnostic command, into a device customized command (e.g., $C1_A$) in some embodiments. For instance, converter 320 may select a database from multiple databases to use for the conversion. For example, if it is determined that the device is manufactured by vendor A, then CLI/OID database 330 may be selected to convert command C1 340 to the device customized command, $C1_A$ 360. On the other hand, if it is determined that the device is manufactured by vendor B, then a different database may be selected to use for the conversion in a similar fashion. It is appreciated that the discussion of selecting a database based on a vendor is exemplary and is not intended to limit the scope of the embodiments. In some embodiments, the converter 320 may convert C1 340 to device customized command, $C1_A$ 360 based on a number of device attributes as described herein, such as model number, operating system used by the device, and the like. In some embodiments, the converter 320 may convert C1 340 based on the device attributes and on a command type (e.g., user selected command type, device specific command type, device type agnostic command type, etc.) of the received command.

In FIG. 3, CLI/OID database 330 includes a list of OIDs that identify the attributes managed by the device, as shown in part of the first row 362, and a column of device type agnostic commands, as shown in column 364, and their corresponding device customized commands, as shown starting from the second row to row N 366 and second column to column N 368 of CLI/OID Database 330. The converter 320 may query CLI/OID Database 330 by passing command C1 and $OID_1$ 350 identifying the attribute of interest as parameters to convert C1 340 into a device customizable command. The device customized command $C1_A$ 370 is identified and subsequently transmitted as the device customized command 360 to the device to be managed.

Although FIG. 3 illustrates CLI/OID Database 330 transmitting the device customized command 360 to the managed device, it is exemplary and not intended to limit the scope of the embodiments. In some embodiments, the device customized command 360 may be transmitted by converter 320 to a managed device.

Figure 4:
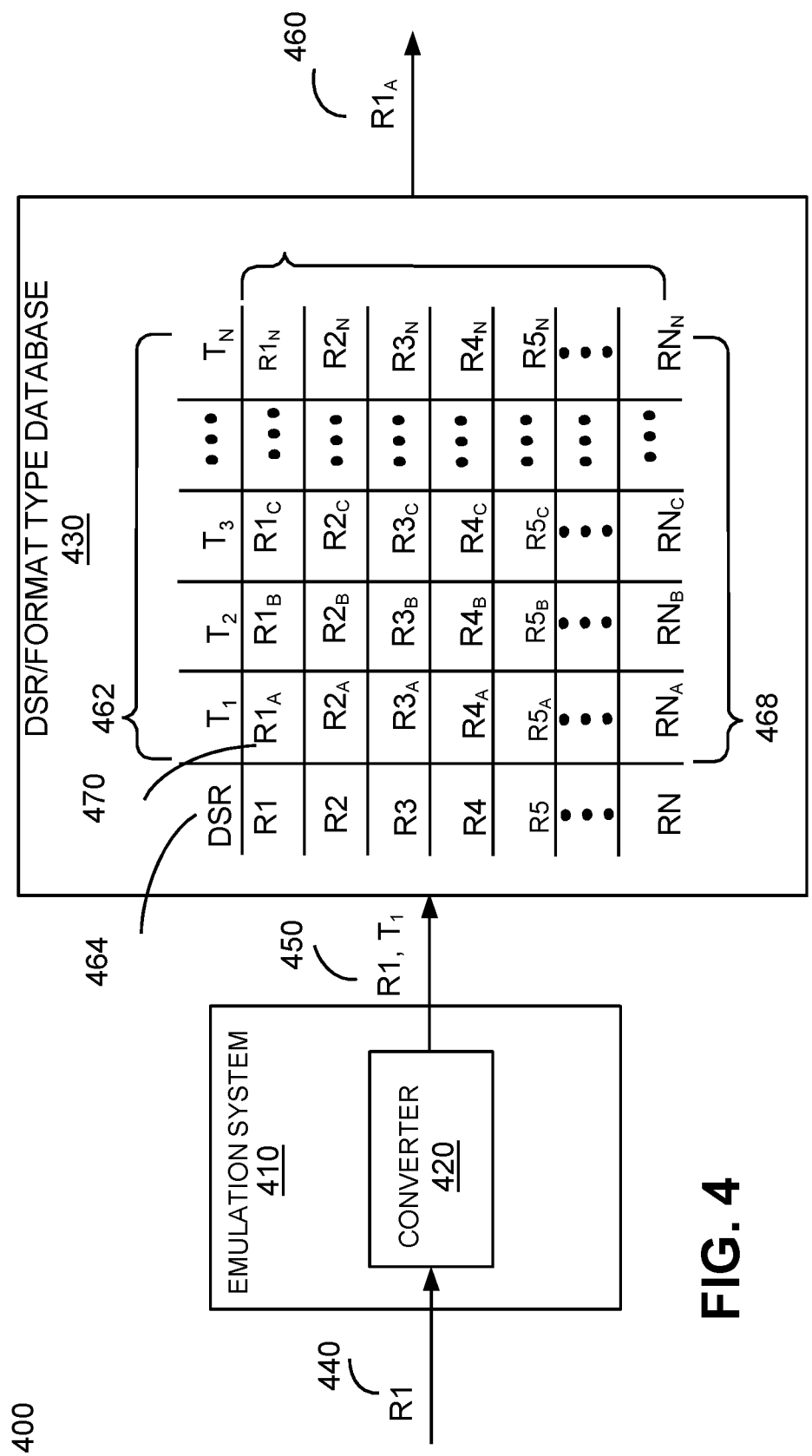
FIG. 4 shows a system that converts a device specific response into a response formatted in accordance with a format type utilized by a CLI emulating a terminal session in accordance with one embodiment.

Referring now to FIG. 4, a system that converts a device specific response into a response formatted in accordance with a format type utilized by a CLI emulating a terminal session is shown in accordance with one embodiment. Similar to system 300 of FIG. 3, system 400 includes an emulation system 410 and a Device Specific Response (DSR)/Format Type database 430.

In some embodiments, emulation system 410 may be configured in a substantial similar manner as emulation systems 150 and 210 of FIGS. 1 and 2, respectively. In some embodiments, the emulation system 410 may include a converter 420. Converter 420 may be configured in a substantially similar manner as converters 194 and 220 of FIGS. 1 and 2, respectively, in some embodiments.

In some embodiments, converter 420 may receive a device specific response, R1 440. The converter 420 may also receive information about the response format type (e.g., $T_1$). In some embodiments, the device specific response R1 440 may be a SNMP response, an XML response, and/or a device specific CLI response.

In some embodiments, converter 420 may convert the device specific response 440 into a response of a response format type utilized by a CLI in an emulated terminal session (e.g., response $R1_A$ 460). In some embodiments, the converter 420 performs the conversion based on device attributes of the device that provided response R1 440. For instance, converter 420 may select a database from multiple databases to convert R1 440. For example, if it is determined that the device is manufactured by vendor A, then database 430 may be selected to use to convert response R1 440 into a format utilized by a CLI in an emulated session. On the other hand, if it is determined that the device is manufactured by vendor B, then a different database may be selected in a similar fashion. It is appreciated that the discussion of selecting a database based on a vendor is exemplary and is not intended to limit the scope of the embodiments. In some embodiments, the converter 420 may convert R1 440 to response $R1_A$ 460 based on a number of device attributes as described herein, such as model number, operating system used by the device, and the like.

In FIG. 4, DSR/FORMAT TYPE database 430 includes a list of format types that identify different response formats used by different emulated sessions, as shown in part of the first row 462, and a column of device specific responses, as shown in column 464, and their corresponding responses, as shown in from the second row to row N 466 and from the second column to column N 468 of DSR/FORMAT TYPE Database 430. The converter 420 may query DSR/FORMAT TYPE Database 430 by passing response R1 440 and T1 450 identifying the format type to convert R1 440. Here, the query may return that the response is $R1_A$ 470, and then the converted response 460 is transmitted for display on a user device.

Figure 5:
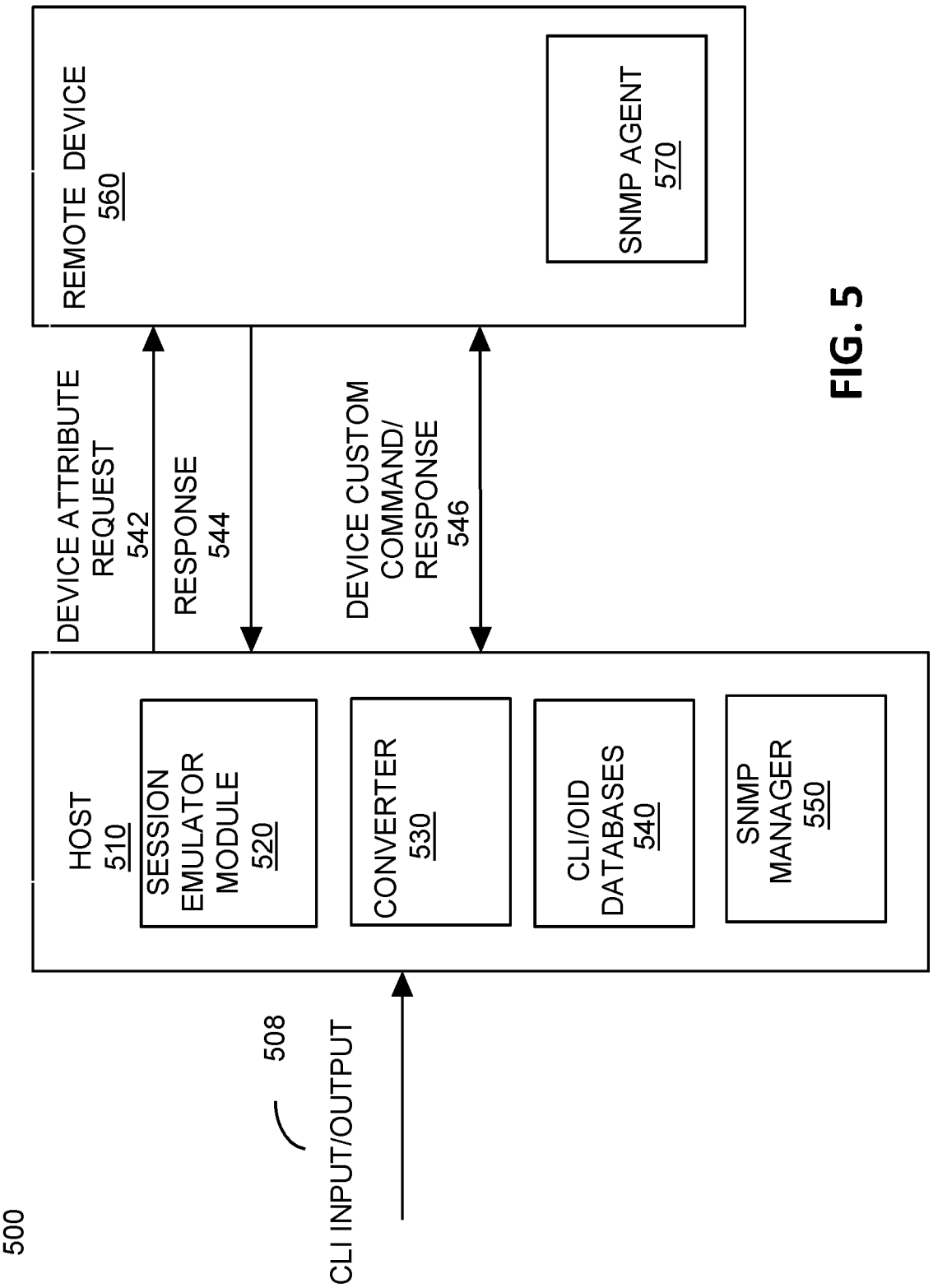
FIG. 5 shows a system utilizing a CLI to manage a Simple Network Management Protocol (SNMP) enabled device in accordance with one embodiment.

Referring now to FIG. 5, a system utilizing a CLI to manage an SNMP enabled device is shown in accordance with one embodiment. In some embodiments, system 500 includes a host 510 and a remote SNMP enabled device 560.

In some embodiments, the host 510 may be a server, a switch/router, a computing device, and/or a portable mobile device configured to emulate a terminal session to manage the remote device 560. In some embodiments, the host 510 includes a session emulator module 520, a converter 530, a CLI/OID database 540 and an SNMP manager 550.

In some embodiments, the session emulator module 520 may be configured to initiate an emulated session with remote device 560 in a substantially similar manner as session emulator module 192 of FIG. 1. Further, in some embodiments, the converter 530 and CLI/OID Database 540 may be substantially similar to the converters 194, 220, 320 of FIGS. 1-3 and the CLI/OID Database of FIG. 3, respectively.

In FIG. 5, the host 510 may receive a CLI input command 508 from a user device (e.g., a switch/router, a server, a personal computing device, a portable computing device) after an emulated terminal session has been established by session emulator module 520. In some embodiments, the host may transmit a request for device attribute 542 to the remote device 560. As described herein, the host 510 may request for device attributes, such as model number, make of remote device 560, vendor information, hardware information, operating system information, and other device attributes as described herein. As noted herein, the host 510 may request device attribute by querying the remote device 560 for a specific OID that identifies the device attribute of interest. In some embodiments, the host 510 may receive a response 544 including data about the device attribute.

In some embodiments, the converter 530 may convert the CLI input 508 into a device customized command 546 based on the device attribute provided in response 544. As described in FIG. 3, converter 530 may select a CLI/OID database from a plurality databases to use for conversion based on the device attribute. Then, the converter 530 may query the selected CLI/OID database for a device customizable command based on the CLI input 508. In this example, because the remote device 560 is a SNMP enabled device, the converter 530 converts CLI input 508 into a SNMP command. The host 510 transmits the device customized command 546 (e.g., SNMP command) from the SNMP manager 550 of the host 510 to SNMP agent 570 of the remote device 560.

As described herein, the host 510 may also be configured to receive device specific responses from remote agent 570 of the remote device 560. For example, the SNMP manager 550 may receive device specific responses from the SNMP agent 570 of the remote device 560 in some embodiments. After the host 510 receives a device specific response 546 (e.g., SNMP response), the converter 530 may convert the response 546 into a CLI output 508 for display on a user device. For instance, the converter 530 may convert the device specific response 546 into a CLI output by querying a database table that includes a list of device specific responses and corresponding CLI outputs in a similar manner as described in FIG. 4.

Figure 6A:
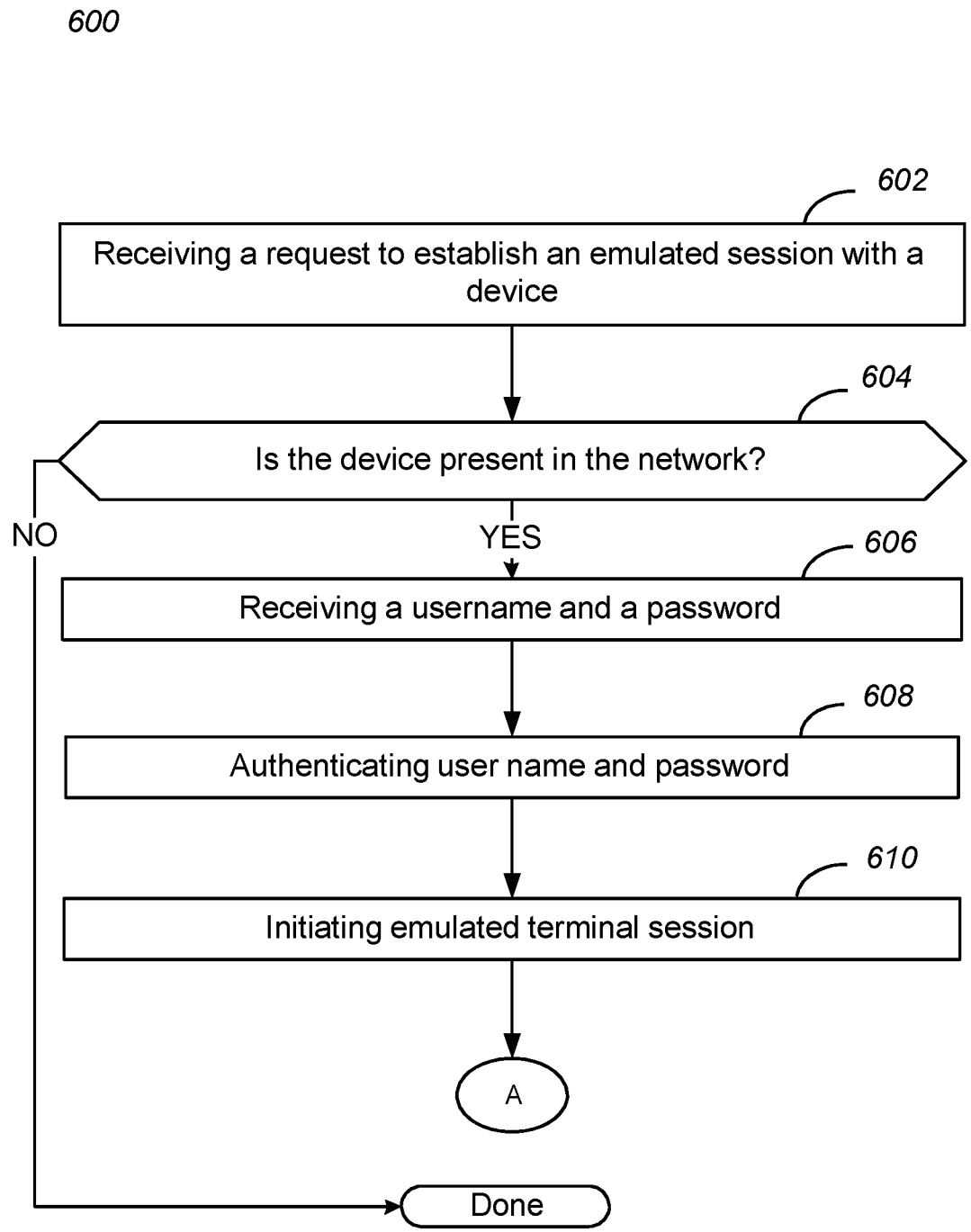
FIGS. 6A-6B show an exemplary flow diagram for managing devices by utilizing a CLI in accordance with one embodiment.
Figure 6B:
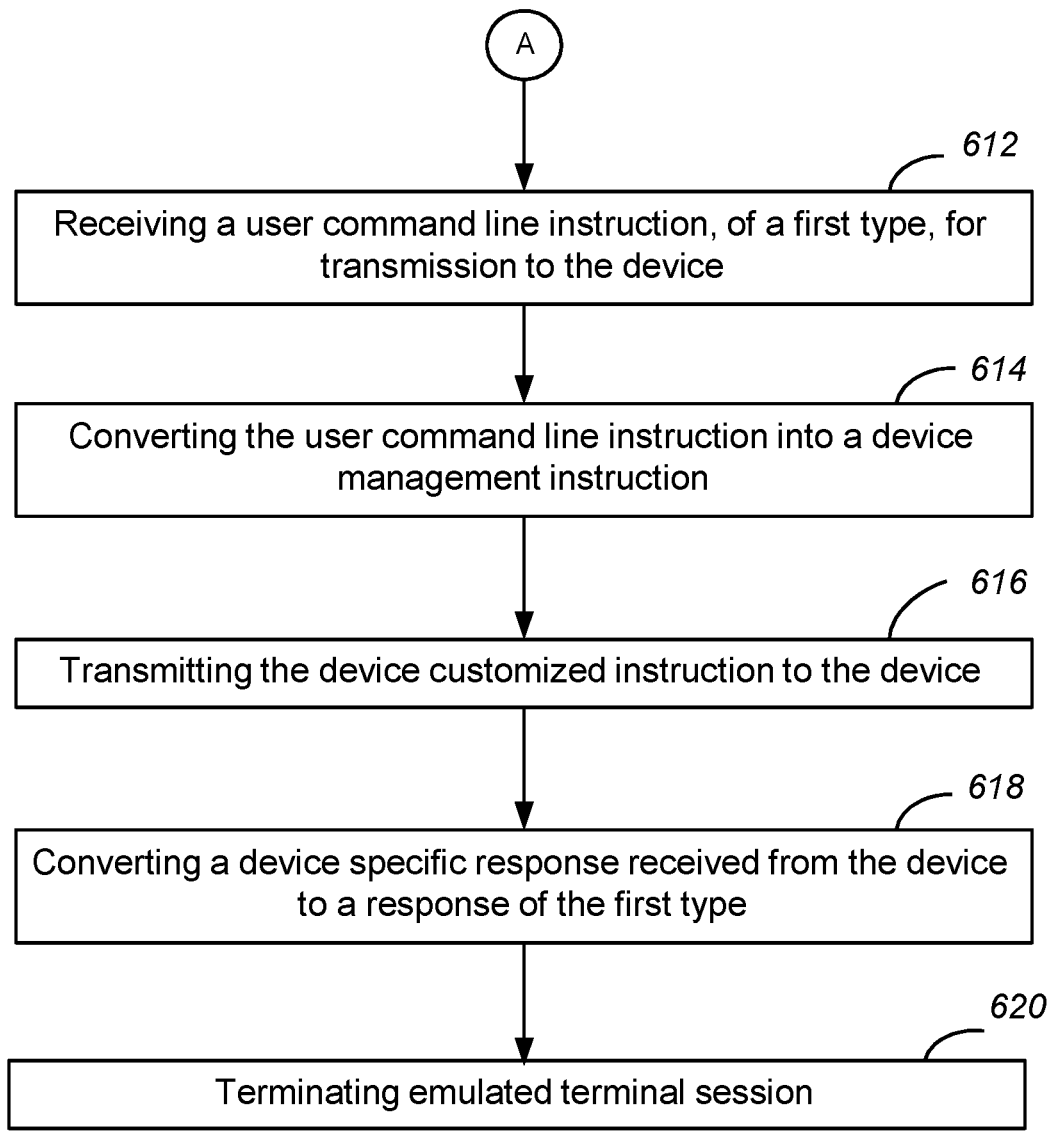

Referring now to FIGS. 6A-6B, an exemplary flow diagram is shown for managing a device by utilizing a CLI in accordance with one embodiment. At step 602, a request to establish an emulated session with a device is received. In some embodiment the request may be received by a session emulator module of an emulation system similar to a session emulator module 192 and 420 of FIGS. 1 and 4, respectively. In some embodiments, the request may be received in response to entering a keyword or an IP address of a device in a shell program. In some embodiments, a request may be received in response to a user selection via a GUI, such as GUI 700 of FIG. 7. In some embodiments, the request may be received in response to a script executing on a computing device and periodically generating a request to establish an emulated session.

At step 604, it is determined whether the device is present in the network in order to establish an emulated session with the device. In some embodiments, this determination may be performed by a session emulator module of an emulation system similar to session emulator modules 192 and 420 of FIGS. 1 and 4. In some embodiments, the presence of a device may be determined by transmitting ICMP requests to the device. In some embodiments, the presence of a device may be determined based on whether the device is SNMP enabled. In some embodiments, the network may be polled for the presence of the device in a network.

If it is determined that the device is present, then method 600 proceeds to step 606. Otherwise, method 600 may end.

At step 606, a username and password may be received. In some embodiments, a session emulator module of an emulation system similar to session emulator modules 194 and 420 of FIGS. 1 and 4, respectively may receive the username and password. In some embodiments, the user name and password is used to authenticate (step 608) the user and determine the user access level for specific devices in the network.

At step 608, the username and password are authenticated. In some embodiments, a session emulator module similar to session emulator module 192 and 420 of FIGS. 1 and 4, respectively, may be used in part to authenticate the username and password received at block 604. In some embodiments, user credentials may be authenticated by providing the user credentials as an authentication string in a query to a device. For example, a session emulator module may query a managed device for device attributes. In this example, the query for device attributes to the device may include an authentication string (e.g., user credentials), which is used by the device to authenticate the user prior to providing a response to the query. Here, if the user is authenticated, then device attribute information (e.g., a value associated with an OID of a device attribute of interest) is received. On the other hand, if the user is not authorized to access the device, then an error message may be received. Then, method 600 may end.

In some instances, user credentials may be authenticated by querying a database. In some embodiments, the user credentials may be verified to determine user access privileges, e.g., read access, write access, configure access, etc. In some embodiments, a device may transmit user credentials to a session emulator module to determine the access type of a user based on the received information from the user and the managed device.

At step 610, an emulated terminal session is initiated in response to authenticating the user name and password at step 608. In some embodiments, the terminal session may be emulated by a session emulator module similar to session emulator modules 192 and 420 of FIGS. 1 and 4, respectively. In some embodiments, an alphanumeric prompt, such as ">>>," "%", "$" and the like, may be displayed on a user device to indicate that an emulated session has been established to allow a user to enter command line instructions to manage a device in a network.

At step 612 (shown in FIG. 6B), a user command line instruction, of a first type, is received for transmission to the device. In some embodiments, the user command line instruction may be received by a converter similar to converters 194, 220, 320, and 420 of FIGS. 1-4, respectively. In some embodiments, the user command line instruction may be formatted in a CLI instruction type that is device type agnostic. In some embodiments, the user command line may be formatted in a CLI instruction type that is device specific, e.g., first device type, second device type, etc.

At step 614, the user command line instruction is converted into a device management instruction and further customized based on device attributes. In some embodiments, the conversion may be performed by a converter similar to converters 194, 220, 320, and 420 of FIGS. 1-4, respectively. In some embodiments, as described herein, the user command line instruction may be converted to a device management command type, such as into SNMP instructions, XML instruction or some other proprietary CLI instruction type, which may be further customized based on device attributes. In some embodiments, as described in FIGS. 1-4, the user command line instruction may be converted by querying a database, as described in FIG. 3.

At step 616, the device customized instruction is transmitted to the device. In some embodiments, the device customized instruction may be transmitted by an emulation system similar to emulation system 150 of FIG. 1. In some embodiments, the device customized instruction may be transmitted by a converter similar to converter 220 of FIG. 2. In some embodiments, the device customized instruction may be transmitted by a host via an SNMP manager to an SNMP agent of a device as described in FIG. 4.

At step 618, a device specific response received from the device is converted into a response of the first type. In some embodiments, a converter similar to converters 194, 220, 430 of FIGS. 1, 2 and 4, respectively, may be used to convert a device specific response to a response formatted in accordance of the first type. In some embodiments, the device specific response may be converted by querying a database for a corresponding response of the first type, as described in FIG. 4.

At step 620, the emulated terminal session may be terminated. In some embodiments, the emulated terminal session may be terminated when a session is idle for specific period of time and/or if a command is received to terminate the emulated session.

As the embodiments disclosed herein illustrate, the command line instruction disclosed herein may utilize the same syntax and semantics with different device types, irrespective of the device specific command line instruction utilized by each device. Accordingly, the embodiments disclosed herein eliminate the need to remember every CLI instruction specific to each device type. Moreover, embodiments described herein enable a user to select command line instructions of a type familiar to the user to manage devices that may use different command line instructions. Further, as the embodiments disclosed herein illustrate, a device specific response may be converted into a response formatted in accordance with a user selected command line instruction type or in accordance with command line instruction utilized by a CLI. In this way, a user may view responses and information about different device types in a uniform and consistent format, irrespective of the device specific response formats utilized by each device in a network.

Figure 8:
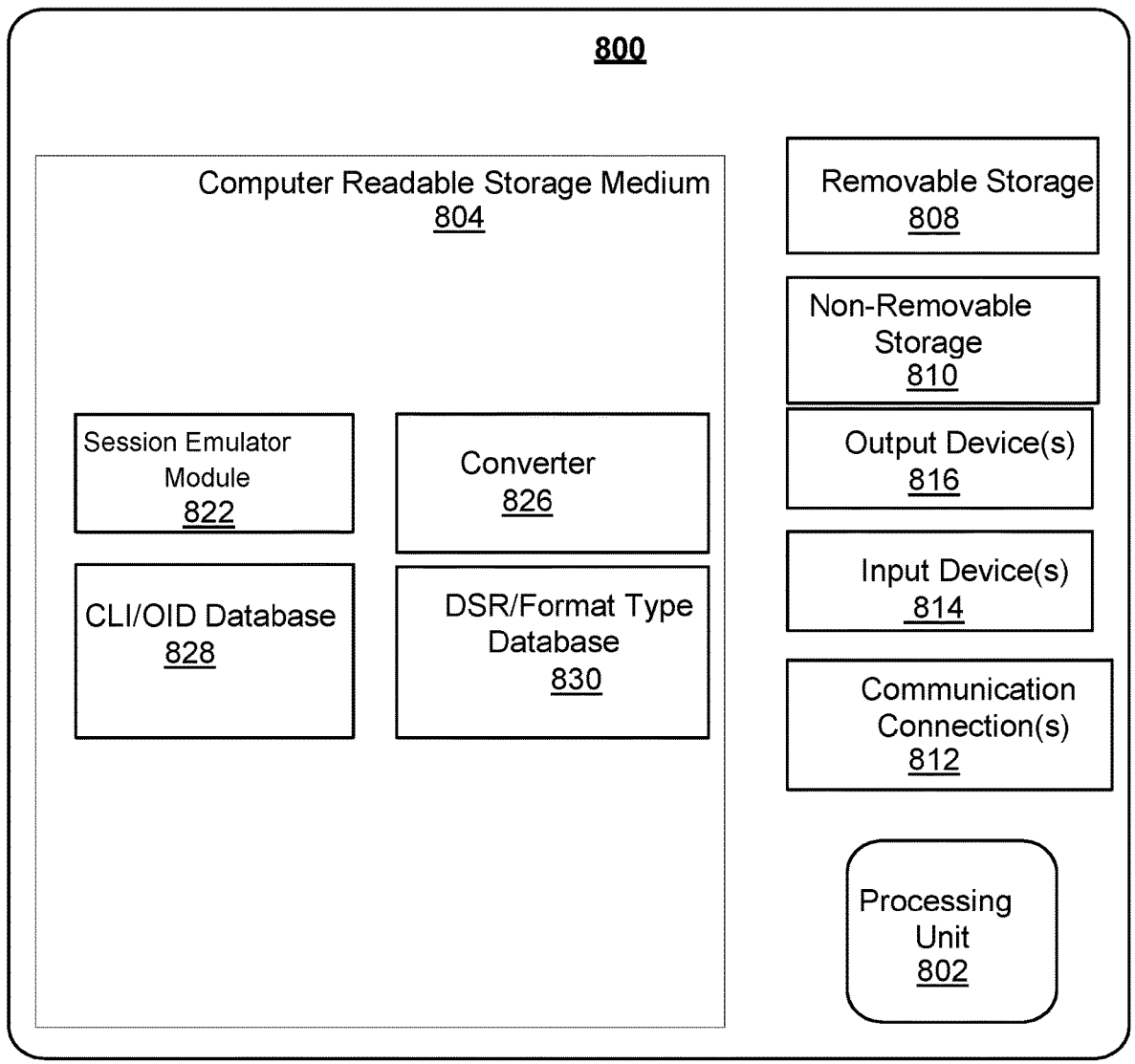
FIG. 8 shows a block diagram of an exemplary computer system in accordance with one embodiment.

Referring now to FIG. 8, a block diagram of an exemplary computer system in accordance with one embodiment is shown. With reference to FIG. 8, an exemplary system module for implementing embodiments disclosed herein, such as the embodiments described in FIGS. 1-5, 6A-6B and FIG. 7. In some embodiments, the system includes a general purpose computing system environment, such as computing system environment 800. Computing system environment 800 may include, but is not limited to, servers, switches, routers, desktop computers, laptops, tablets, mobile devices, and smartphones. In its most basic configuration, computing system environment 800 typically includes at least one processing unit 802 and computer readable storage medium 804. Depending on the exact configuration and type of computing system environment, computer readable storage medium 804 may be volatile (such as RAM), non-volatile (such as ROM, flash memory, etc.) or some combination of the two. Portions of computer readable storage medium 804 when executed facilitates the configuring of devices according to embodiments described herein (e.g., process 600).

Additionally in various embodiments, computing system environment 800 may also have other features/functionality. For example, computing system environment 800 may also include additional storage (removable and/or non-removable) including, but not limited to, magnetic or optical disks or tape. Such additional storage is illustrated by removable storage 808 and non-removable storage 810. Computer storage media includes volatile and nonvolatile, removable and non-removable media implemented in any method or technology for storage of information such as computer readable instructions, data structures, program modules or other data. Computer readable medium 804, removable storage 808 and nonremovable storage 810 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 800. Any such computer storage media may be part of computing system environment 800.

In some embodiments, computing system environment 800 may also contain communications connection(s) 812 that allow it to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 812 may allow computing system environment 800 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 812 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 800 may also have input device(s) 814 such as keyboard, mouse, a terminal or terminal emulator (either directly connected or remotely accessible via telnet, SSH, http, SSL, etc.), pen, voice input device, touch input device, remote control, etc. Output device(s) 816 such as a display, a terminal or terminal emulator (either directly connected or remotely accessible via telnet, SSH, http, SSL, etc.), speakers, LEDs, etc. may also be included.

In one embodiment, computer readable storage medium 804 includes a session emulator module 822, a converter 826, a CLI/OID Database 828, and a DSR/Format Type database 830. The session emulator module 822 is operable to emulate a terminal session to allow management of devices using a device type agnostic command line instructions, as discussed in FIGS. 1, 5 and steps 602-610 of method 600. The converter 826 may be used to convert command line instructions (e.g., device type agnostic command line instructions, device specific command line instructions) into device customized instructions, and convert device specific responses into response formatted in accordance with a format command line instructions utilized by a CLI emulating a terminal session. In some embodiments, the device specific responses may be converted into a user selected response format. In some embodiments, the converter may convert device specific response in a manner as described in FIGS. 1-5 and steps 612-618 of method 600. The converter 826 may be operable to perform the conversion with reference to CLI/OID Database 828 and DSR/Format Type Database 830 as described in FIGS. 3-4 and steps 614 and 618 of method 600.

It is appreciated that implementations according to embodiments that are described with respect to a computer system are merely exemplary and not intended to limit the scope of the embodiments. For example, embodiments may be implemented on devices such as switches and routers, which may contain application specific integrated circuits (ASICs), field programmable gate arrays (FPGAs), etc. It is appreciated that these devices may include a computer readable medium for storing instructions for implementing methods according to flow diagram 600.

Figure 9:
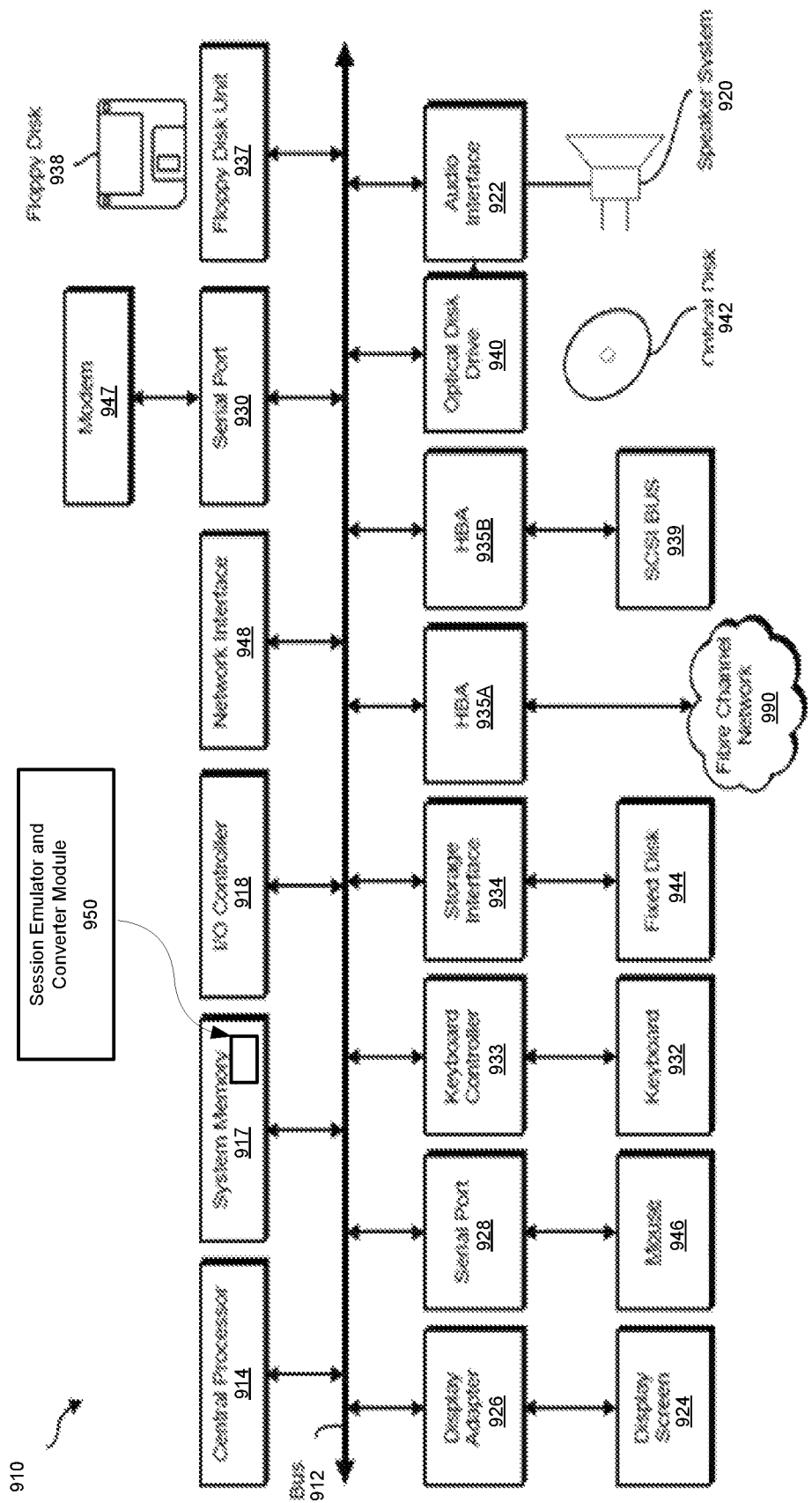
FIG. 9 shows a block diagram of another exemplary computer system in accordance with one embodiment.

Referring now to FIG. 9, a block diagram of another exemplary computer system in accordance with one embodiment is shown. FIG. 9 depicts a block diagram of a computer system 910 suitable for implementing the present disclosure. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912). It is appreciated that the network interface 948 may include one or more Ethernet ports, wireless local area network (WLAN) interfaces, etc., but is not limited thereto. System memory 917 includes a session emulator and converter module 950, which is operable to emulate a terminal session to manage devices using a single command line instruction (e.g., device type agnostic command line instructions, device specific command line instructions) into multiple and different customized instructions, regardless of the device type. According to one embodiment, the session emulator and converter module 950 may include other modules for carrying out various tasks. For example, the session emulator and converter module 950 may include the session emulator module 822, the converter 826, the CLI/OID Database 828, the DSR/Format Type Database 830, as discussed with respect to FIG. 8 above. It is appreciated that the session emulator and converter module 950 may be located anywhere in the system and is not limited to the system memory 917. As such, residing within the system memory 917 is merely exemplary and not intended to limit the scope of the embodiments. For example, parts of the session emulator and converter module 950 may be located within the central processor 914 and/or the network interface 948 but are not limited thereto.

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Network interface 948 may provide multiple connections to networked devices. Furthermore, modem 947 may provide a direct connection to a remote server via a telephone link or to the Internet via an internet service provider (ISP). Network interface 948 provides one or more connections to a data network, which may consist of any number of other network-connected devices. Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:
1. A method comprising:
receiving, from a user device, a first user input associated with selection of a plurality of managed devices;
receiving, from the user device, a second user input associated with selection of a first command line instruction type from a plurality of command line instruction types, wherein the first command line instruction type is associated with a format of a command line instruction associated with one of the plurality of managed devices;
receiving, from the user device, a third user input associated with selection of a second command line instruction type of the plurality of command line instruction types, wherein the second command line instruction type is associated with a format of a response to be received from each of the plurality of managed devices;
emulating a terminal session based on the first user input, second user input, and third user input, wherein the emulating renders appearance of a direct connection based terminal session between the user device and the plurality of managed devices;
receiving a user command line instruction from the emulated terminal session, of the first command line instruction type, wherein the user command line instruction is associated with a device specific command line instruction associated with one of the plurality of managed devices;

querying the plurality of managed devices for object identifiers associated with each of the plurality of managed devices;

determining a plurality of device attributes based on the object identifiers associated with each of the plurality of managed devices by querying a first table within a first database, wherein the query comprises one of the object identifiers associated with each of the plurality of the managed devices as an input parameter;

selecting a second table and a third table for conversion within a second database from a set of databases based on the determined plurality of device attributes of each of the plurality of managed devices;

determining if the received user command line instruction is supported by each of the plurality of managed devices based on the object identifiers associated with each of the plurality of managed devices;

converting the user command line instruction into a plurality of customized instructions for the plurality of managed devices based on the determined plurality of device attributes, wherein each customized instruction of the plurality of customized instructions comprises a device specific command line instruction associated with a respective managed device of the plurality of managed devices based on the plurality of device attributes associated with a corresponding managed device of the plurality of managed devices;

transmitting the device specific command line instruction of each of the plurality of customized instructions to the respective managed device of the plurality of managed devices;

converting a plurality of device specific responses to the second command line instruction type, wherein each of the plurality of device specific responses is generated by the respective managed device of the plurality of managed devices; and displaying the plurality of converted device specific responses of the second command line instruction type on the user device;

wherein the object identifiers include a model number of each of the plurality of managed devices, a make of each of the plurality of managed devices, vendor information of each of the plurality of managed devices, hardware information including a memory size of each of the plurality of managed devices, and operating system information of each of the plurality of managed devices.

2. The method as described in claim 1, wherein a first syntax and semantics of the user command line instruction is device type agnostic.

3. The method as described in claim 1 further comprising: transmitting user credentials of the user with the user command line instruction to a managed device, wherein the user credentials comprise a username and a password, wherein the user can manage the managed device if an object identifier (OID) is returned, and wherein the user cannot manage the managed device if an error message is returned.

4. The method as described in claim 3, wherein the device attributes are operating system, vendor information and model number of the managed device.

5. The method as described in claim 1, wherein the a transmission of the device specific command line instructions and receipt of a responses associated therewith utilizes simple network management protocol (SNMP) and Extensible Markup Language (XML).

6. The method as described in claim 1, wherein converting the user command line instruction further comprises: accessing the second table in the second database from at least one of: a memory of an emulation system and a database storing device attributes associated with devices within a network.

7. The method of claim 1 wherein converting a user command line instruction comprises querying the second table within the second database that associates command line instructions and attributes of a managed device into device specific instructions wherein querying the second table comprises the user command line instruction and at least one device attribute of a managed device as input parameters; and wherein the second table comprises a lookup table with an input column corresponding to the user command line instruction input parameter and an input row corresponding to the device attribute input parameter such that the customized instructions can be identified based on the input parameters.

8. The method of claim 7 wherein converting a device specific response comprises querying the third table within the second database that associates device specific responses into a response of the second command line instruction type wherein the query comprises a device specific response and response format type as input parameters; and wherein the third table comprises a lookup table with an input column corresponding to the device specific response input parameter and an input row corresponding to the response format type input parameter such that the response corresponding to the second command line instruction type can be identified based on the input parameters.

9. The method as described in claim 1, wherein determining a plurality of device attributes further comprises accessing the first table in the first database from at least one of: a memory of an emulation system and a database storing device attributes associated with devices within a network.

10. An apparatus comprising:
a memory; and
a processor configured to:
receive, from a user device, a first user input associated with selection of a plurality of managed devices;
receive, from the user device, a second user input associated with selection of a first command line instruction type from a plurality of command line instruction types, wherein the first command line instruction type is associated with a format of a command line instruction associated with one of the plurality of managed devices;
receive, from the user device, a third user input associated with selection of a second command line instruction type of the plurality of command line instruction types, wherein the second command line instruction type is associated with a format of a response to be received from each of the plurality of managed devices;
emulate a terminal session based on the first user input, second user input, and third user input, wherein the emulating renders appearance of a direct connection based terminal session between the user device and the plurality of managed devices;
receive a user command line instruction from the emulated terminal session, of the first command line instruction type, wherein the user command line instruction is associated with a device specific command line instruction associated with one of the plurality of managed devices;

query the plurality of managed devices for object identifiers associated with each of the plurality of managed devices;
determine a plurality of device attributes based on the object identifiers associated with each of the plurality of managed devices by querying a first table within a first database, wherein the query comprises one of the object identifiers associated with each of the plurality of managed devices as an input parameter;
select a second table and a third table for conversion within a second database from a set of databases based on the determined plurality of device attributes of each of the plurality of managed devices;
determine if the received user command line instruction is supported by each of the plurality of managed devices based on the object identifiers associated with each of the plurality of managed devices;
convert the user command line instruction to a plurality of customized instructions for the plurality of managed devices based on the determined plurality of device attributes, wherein each customized instruction of the plurality of customized instructions comprises a device specific command line instruction associated with a respective managed device of the plurality of managed devices based on the plurality of device attributes associated with a corresponding managed device of the plurality of managed devices;
transmit the device customized instruction of each of the plurality of customized instructions to the respective managed device of the plurality of managed devices;
convert a plurality of device specific responses to the second command line instruction type, wherein each of the plurality of device specific responses is generated by the respective managed device of the plurality of managed devices; and
display the plurality of converted device specific responses of the second command line instruction type on the user device;
wherein the object identifiers include a model number of each of the plurality of managed devices, a make of each of the plurality of managed devices, vendor information of each of the plurality of managed devices, hardware information including a memory size of each of the plurality of managed devices, and operating system information of each of the plurality of managed devices.

11. The apparatus as described in claim 10, wherein determining a plurality of device attributes further comprises accessing the first table in the first database from a memory of an emulation system; and
wherein converting the user command line instruction further comprises accessing the second and third tables in the second and third databases from at least one of: a memory of an emulation system and a database storing device attributes associated with devices within a network.

12. A non-transitory computer-readable storage medium having stored thereon, computer executable instructions that, if executed by a plurality of managed devices, causes the plurality of managed devices to perform a method comprising:
receiving, from a user device, a first user input associated with selection of a plurality of managed devices;
receiving, from the user device, a second user input associated with selection of a first command line instruction type from a plurality of command line instruction types, wherein the first command line instruction type is associated with a format of a command line instruction associated with one of the plurality of managed devices;
receiving, from the user device, a third user input associated with selection of a second command line instruction type of the plurality of command line instruction types, wherein the second command line instruction type is associated with a format of a response to be received from each of the plurality of managed devices;
emulating a terminal session based on the first user input, second user input, and third user input, wherein the emulating renders appearance of a direct connection-based terminal session between the user device and the plurality of managed devices;
receiving a user command line instruction, from the emulated terminal session, of the first command line instruction type, wherein the user command line instruction is associated with a device specific command line instruction associated with one of a plurality of managed devices;
querying the plurality of managed devices for object identifiers associated with each of the plurality of managed devices;
determining a plurality of device attributes based on the object identifiers associated with each of the plurality of managed devices by querying a first table within a first database, wherein the query comprises one of the object identifiers associated with each of the plurality of the managed devices as an input parameter;
selecting a second table and a third table for conversion within a second database from a set of databases based on the determined plurality of device attributes of each of the plurality of managed devices;
determining whether attributes to be configured are available and supported by each of the plurality of managed devices based on the object identifiers associated with each of the plurality of managed devices;
converting the user command line instruction to a plurality of customized instructions for the plurality of managed devices based on the determined plurality of device attributes, wherein each customized instruction of the plurality of customized instructions comprises a device specific command line instruction associated with a respective managed device of the plurality of managed devices based on the plurality of device attributes associated with a corresponding managed device of the plurality of managed devices;
transmitting the device specific command line instruction of each of the plurality of customized instructions to the respective managed device of the plurality of managed devices;
converting a plurality of device specific responses to the second command line instruction type, wherein each of the plurality of device specific responses is generated by the respective managed device of the plurality of managed devices; and
displaying the plurality of converted device specific responses of the second command line instruction type on the user device;
wherein the object identifiers include a model number of each of the plurality of managed devices, a make of each of the managed devices, vendor information of each of the plurality of managed devices, hardware information including a memory size of each of the plurality of managed devices, and operating system information of each of the plurality of managed devices.

13. The non-transitory computer-readable storage medium of claim 12, the method further comprising:
   converting a device specific response received from the plurality of managed devices to a first response; and
   converting a device specific response received from the plurality of managed devices to a second response.

14. The non-transitory computer-readable storage medium of claim 12, wherein transmission of customized instructions utilizes simple network management protocol (SNMP).

15. The non-transitory computer-readable storage medium of claim 12, wherein each of the plurality of managed devices are different type devices, and wherein the user command line instruction is received from a user device.

16. The non-transitory computer-readable storage medium of claim 12, wherein determining a plurality of device attributes further comprises accessing the first table in the first database from a memory of an emulation system; and
   wherein converting the user command line instruction further comprises accessing the second and third tables in the second and third databases from at least one of: a memory of an emulation system and a database storing device attributes associated with devices within a network.

* * * * *